·

US006212631B1

(12) United States Patent
Springer et al.

(10) Patent No.: US 6,212,631 B1
(45) Date of Patent: Apr. 3, 2001

(54) METHOD AND APPARATUS FOR AUTOMATIC L2 CACHE ECC CONFIGURATION IN A COMPUTER SYSTEM

(75) Inventors: David Scott Springer; Anthony Armstrong; Brian Todd Zucker, all of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/232,858

(22) Filed: Jan. 15, 1999

(51) Int. Cl.$^7$ ................................ G06F 9/00; G06F 9/24; G06F 15/177
(52) U.S. Cl. ........................... 713/1; 713/100; 714/763
(58) Field of Search ................. 714/763, 48, 36, 714/47, 703; 713/2, 100, 187, 1; 712/1; 711/102; 365/230.06; 710/8

(56) References Cited

U.S. PATENT DOCUMENTS

| | | | |
|---|---|---|---|
| 4,070,704 | * | 1/1978 | Calle et al. ......................... 713/100 |
| 4,995,041 | | 2/1991 | Hetherington et al. . |
| 5,263,148 | * | 11/1993 | Jones, Jr. et al. ..................... 713/1 |
| 5,504,904 | * | 4/1996 | Dayan et al. ........................ 713/1 |
| 5,504,905 | * | 4/1996 | Cleary et al. ...................... 713/100 |
| 5,559,958 | | 9/1996 | Farrand et al. . |
| 5,598,422 | | 1/1997 | Longwell et al. . |
| 5,613,125 | * | 3/1997 | Nguyen et al. ...................... 713/1 |
| 5,630,055 | | 5/1997 | Bannon et al. . |
| 5,675,794 | * | 10/1997 | Meredith .......................... 713/1 |
| 5,790,849 | * | 8/1998 | Crocker et al. ..................... 713/2 |
| 5,809,329 | * | 9/1998 | Lichtman et al. ................... 710/8 |
| 5,926,642 | * | 7/1999 | Favor ............................ 712/1 |
| 5,987,627 | * | 11/1999 | Rawlings, III ...................... 714/48 |
| 6,047,373 | * | 4/2000 | Hall et al. ......................... 713/1 |

OTHER PUBLICATIONS

"MR User's Manual", Microid Research, Inc., North Andover, MI, 1997.*
System Management BIOS Reference Specification, Version 2.2, American Megatrends, Inc., Mar. 1998.*
System Management BIOS Reference Specification, Version 2.2, American Megatrends, Inc., Mar. 1999.*

* cited by examiner

*Primary Examiner*—Albert Decady
*Assistant Examiner*—Joseph Torres
(74) *Attorney, Agent, or Firm*—Haynes and Boone, L.L.P.

(57) ABSTRACT

A computer system is disclosed which includes at least one microprocessor having an L2 cache, at least one memory, and basic input output system (BIOS) firmware. The L2 cache includes error checking and correcting capability (ECC). The at least one memory includes either all ECC capable memory or any combination of ECC capable and non-ECC capable memory. Lastly, the basic input output system (BIOS) firmware includes an L2 cache support feature. The L2 cache support feature includes three user-selectable options, the three options including i) L2 cache ECC ON, ii) L2 cache ECC OFF, and iii) L2 cache AUTO. Selection of L2 cache ECC ON is for enabling L2 cache ECC. Selection of L2 cache ECC OFF is for not enabling L2 cache ECC. Lastly, selection of L2 cache ECC AUTO is for automatically enabling or not enabling L2 cache ECC in response to a detection of the presence of a) all ECC capable memory or b) any combination of ECC and non-ECC capable memory, respectively. Accordingly, an optimal reliability or an optimal performance can be automatically assured.

20 Claims, 2 Drawing Sheets

Fig. 1
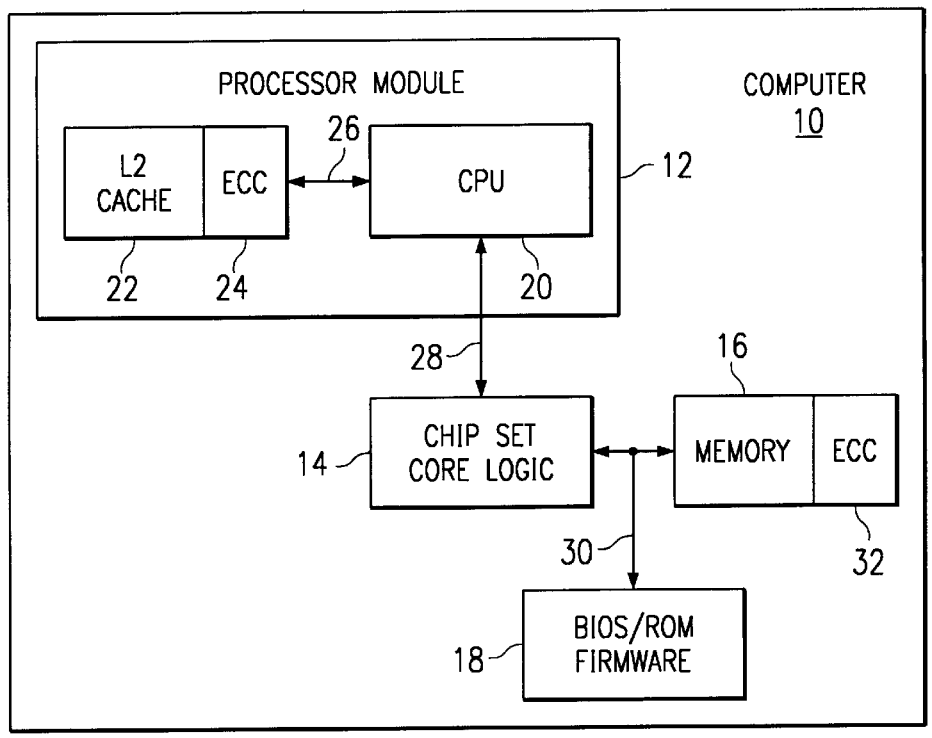
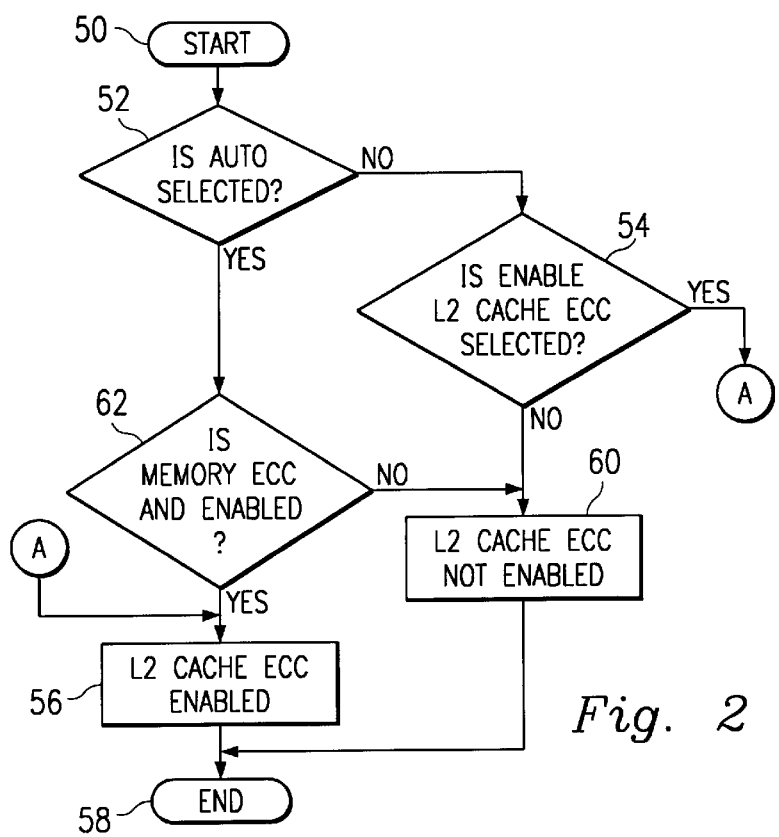
Fig. 2

METHOD AND APPARATUS FOR AUTOMATIC L2 CACHE ECC CONFIGURATION IN A COMPUTER SYSTEM

BACKGROUND

The present disclosure relates generally to computer systems, and more particularly, to error correction of cache memory with respect to main memory.

In the field of high speed computing, processor speed is generally limited by memory performance. For example, the CPU executes instructions at a predetermined rate. Similarly, main memory performs read and write operations at a second predetermined rate which is typically less than one order of magnitude slower than the CPU execution rate. In other words, the access time of main memory is insufficient to keep up with the CPU. Thus, during the execution of memory access instructions, CPU performance will degrade to the memory access rate. The CPU must wait for memory to complete its cycle on every instruction execution.

It is possible to construct a special-purpose memory which has a cycle-time approximately equal to that of the CPU's instruction cycle time. Unfortunately, such memories are far more expensive than typical semiconductor memories and are generally not feasible as a total primary memory solution. Accordingly, many computer systems compromise by constructing a relatively small cache of this high speed memory while retaining the slower semiconductor memory as the primary memory.

The cache is managed under hardware control to maintain a copy of a portion of the main memory which is likely to be used by the CPU. Thus, as long as the CPU only accesses those memory locations maintained in the cache, the CPU will execute at close to full speed. Of course, it is inevitable that the CPU will occasionally attempt to read a memory location not contained in the cache. During these misses, the data are retrieved from main memory and stored in the cache. Therefore, CPU performance degrades to the main memory access rate during misses, but the overall speed of the processor is enhanced by the use of the high speed cache.

Use of the cache memory is not free from complications. Data consistency problems can arise by using a cache to store data that also appear in the primary memory. For example, data which is modified by the CPU and stored in the cache is necessarily different from the data stored at that same memory location in the primary memory. Generally, various methods of ensuring data consistency are employed, for example: a write-through method, a dirty-bit method, and with the use of error correction code hardware, also referred to as error checking and correcting (ECC) hardware. These various methods are known in the art and only briefly mentioned herein.

In the operation of high-speed computers, it is thus frequently advantageous to employ a high speed cache memory with a CPU. A standard, slower memory configuration remains in use for the large, common main memory, but those portions of main memory which are expected to be used heavily are copied into the cache memory. Thus, on many memory references, the faster cache memory is exploited, while only infrequent references to the slower main memory are necessary. This configuration generally speeds the overall operation of the computer system; however, memory integrity problems arise by maintaining two separate copies of selected portions of main memory. Accordingly, the memory access unit of the CPU uses ECC to ensure the integrity of the data delivered between the cache and main memory.

Some computer users desire high reliability, while others desire maximum performance. Their preference is apparent for example, by their selection of ECC or non-ECC memory (e.g., DRAM) in a respective initial system configuration. In addition, currently available BIOS (basic input output system) for Intel® based motherboards offer a setup option for L2 Cache ECC as either ON or OFF. A default setting for the L2 Cache ECC (i.e., either ON or OFF) is typically chosen by a computer manufacturer installing such a motherboard into a computer system. Any change to the opposite state, from ON to OFF or from OFF to ON is up to the user. Enabling ECC in either one or both of the cache or the DRAM causes a noticeable performance hit.

While the selection of ECC or non-ECC DRAM is an option offered to the customer at order time, the choice of ECC or non-ECC L2 cache enabling is buried in the BIOS settings for the respective computer motherboard. Most users will not readily realize that the settings for ECC or non-ECC L2 cache exists in the BIOS setup. The computer user typically uses the factory default setting for L2 cache ECC. If the default for L2 cache ECC is OFF, then an improved performance will be gained. However, if L2 cache ECC is ON, then an increased reliability of single bit error correction in the L2 cache subsystem will be gained. However, if a system user desires a maximum performance and the default for L2 cache ECC is ON, then the maximum performance will not be obtained. Similarly, if the user desires a high system reliability and the default for L2 cache ECC is OFF, then the high system reliability will not be obtained.

With respect to DRAM ECC, detection and configuration of system DRAM ECC is accomplished via the BIOS (basic input output system). That is, a function in the BIOS detects whether system DRAM is capable of ECC. Since DRAM having ECC capability carries with it a cost premium, it is assumed that a computer user wants memory ECC enabled if memory ECC is present.

On computer systems which employ L2 cache ECC, a BIOS setup screen is typically provided, the set-up screen providing an option for enabling and disabling the L2 cache ECC, either on or off, respectively. The user is expected to select a preference. In any case, a default must be decided open, sacrificing either performance or reliability.

An improved method and apparatus for the enabling/disabling of L2 cache ECC is thus desired. In addition, it is also desired to overcome a problem of non-optimal usage of error checking and correcting within a computer system.

SUMMARY

According to one embodiment of the present disclosure, a computer system includes at least one microprocessor having an L2 cache, at least one memory, and basic input output system (BIOS) firmware. The L2 cache includes error checking and correcting capability (ECC). The at least one memory includes either all ECC capable memory or any combination of ECC capable and non-ECC capable memory. Lastly, the BIOS firmware includes an L2 cache support feature, wherein the L2 cache support feature includes three user-selectable options. The three options include i) L2 cache ECC ON, ii) L2 cache ECC OFF, and iii) L2 cache AUTO. L2 cache ECC ON is for enabling L2 cache ECC. L2 cache ECC OFF is for not enabling L2 cache ECC. Lastly, L2 cache ECC AUTO is for automatically enabling or not enabling L2 cache ECC in response to a detection of the presence of a) all ECC capable memory or b) any combination of ECC and non-ECC capable memory, respectively.

A technical advantage of the present embodiments is that an optimal performance or an optimal reliability can be obtained with a computer system having L2 cache ECC capability, wherein enabling of L2 cache ECC capability is automatically aligned with that of ECC capable memory or other ECC capable component.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which:

FIG. 1 illustrates a computer system configuration including a processor module, chip set core logic, memory, and BIOS for implementing an embodiment of the automatic L2 cache ECC method and apparatus according to the present disclosure;

FIG. 2 is a flow diagram of one embodiment of the method for implementing the automatic L2 cache ECC according to the present disclosure;

DETAILED DESCRIPTION

Figures 3, 4:
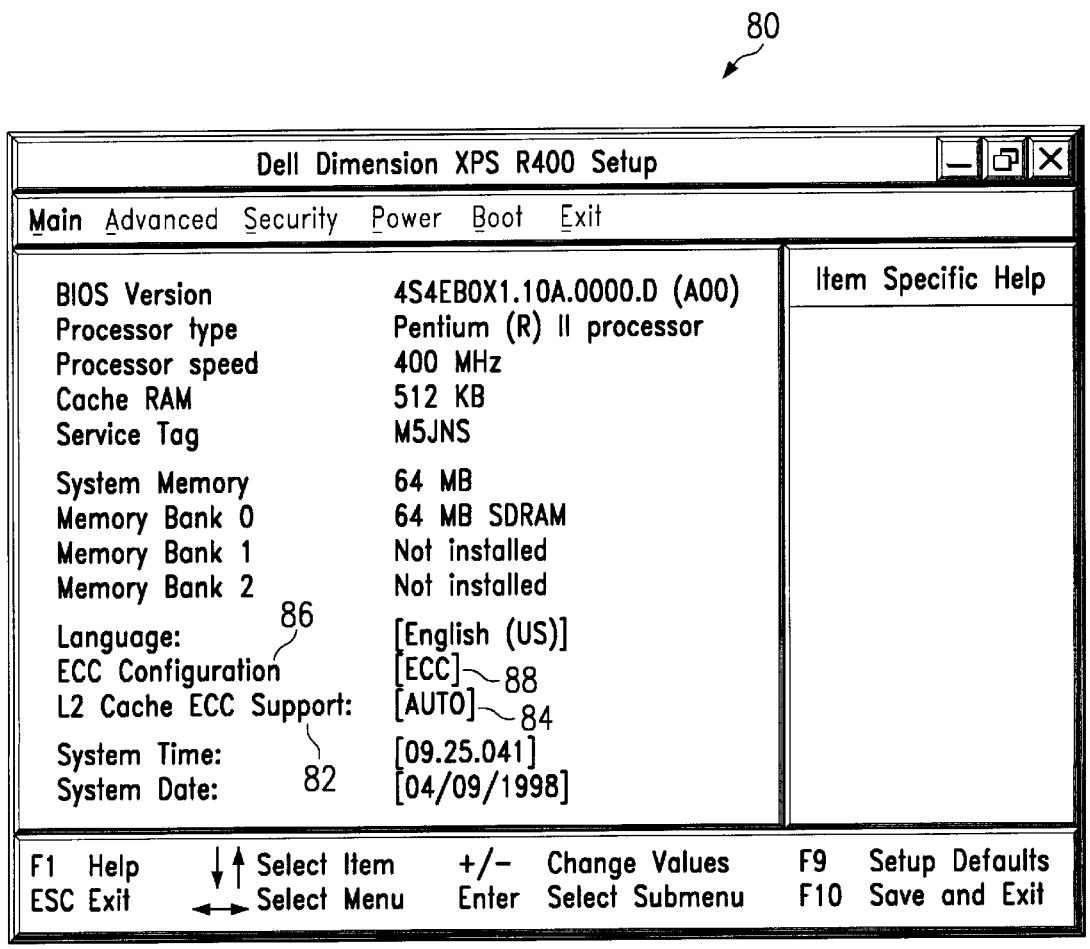
FIG. 3 illustrates a chart of possible system configuration combinations with respect to memory ECC, L2 cache ECC, and a corresponding resulting configuration benefit for further illustration of the method and apparatus of the present disclosure.
FIG. 4 illustrates an exemplary BIOS set-up screen for implementation of the automatic L2 cache ECC according to the present disclosure.

According to one embodiment of the present disclosure, a method and apparatus as discussed herein advantageously provide for the automatic selection of L2 cache ECC based upon the presence or absence of an all ECC capable memory or DRAM (dynamic random access memory). In the past, either L2 cache ECC ON or L2 cache ECC OFF were the only available options. In conjunction therewith, according to the present embodiments, an additional setting has been added to an L2 cache ECC support option in the basic input output system (BIOS) setup of a prescribed computer system. This third option is referred to herein as the L2 cache ECC AUTO selection or option. Preferably, the L2 cache ECC AUTO option is a factory default setting. The L2 cache ECC AUTO function advantageously configures the L2 cache ECC during a BIOS power on self test (POST) if all ECC capable memory (i.e., DRAM) is detected in the computer system. In addition, the L2 cache ECC AUTO setting operates to disable or turn off the L2 cache ECC if any combination of ECC capable and non-ECC capable memory of a main memory, other than an all ECC capable memory, is detected.

Referring now to FIG. 1, a computer 10 includes a processor module 12, chip set core logic 14, memory 16, and read only memory (ROM) 18. Processor module 12 includes central processing unit (CPU) 20 and an L2 cache memory (L2 cache) 22. A portion 24 of the L2 cache 22 is reserved for use in conjunction with ECC. Chip set core logic 14 includes the core logic required for operation of the processor and other modules, as is known in the art. CPU 20 is coupled to L2 cache 22 via an internal processor bus 26. Processor module 12 is coupled to the chip set core logic 14 via a system bus 28. Chip set logic 14 is further coupled to memory 16 via a memory bus 30. Chip set logic 14 is also coupled to ROM 18 via memory bus 30. ROM 18 includes the computer system basic input output system (BIOS) or firmware of computer 10. Computer 10 further includes other standard components which are known in the art and not shown in the figures nor described further herein for simplicity of explanation.

With computer manufacturing, it is generally assumed that a customer spending extra money for ECC capable DRAM is more concerned about overall system reliability, at the expense of performance. In addition, a customer who desires ECC capable DRAM is also assumed to be willing to take the additional performance hit in L2 cache accesses to further improve system reliability.

The BIOS settings provided for L2 cache ECC according to the present embodiments include the states of ON, OFF, and AUTO. The manual override settings of ON and OFF enable a customer to manually control or switch the L2 cache ECC setting if so desired, for instance, when the assumptions regarding performance versus reliability prove to be incorrect for a given computer user. In addition to modifying L2 cache ECC on or off, according to an alternate embodiment, yet another option can be provided in the BIOS settings for enabling or disabling the error checking and correcting in the ECC DRAM if so desired by the customer.

In Pentium II® processors which are currently commercially available from Intel Corporation, there exists a programmable register integrated into the CPU architecture which enables a software selection of L2 cache ECC, further which is integrated into the processor module. The method and apparatus of the present disclosure advantageously provide for an automatic configuration of the L2 cache ECC to provide for a maximum performance or a maximum reliability upon selection of the L2 cache ECC AUTO option, further as discussed herein. A customer or computer user need not know what L2 cache ECC is or which state is optimal for his or her preference. The preference is assumed, for example, as indicated by the type of memory ordered with the computer system or resident in the computer system. In addition, the computer manufacturer need not detect and/or manage the L2 cache ECC configuration with scripting or other difficult to implement methods. Instead, the method and apparatus of the present disclosure provide for an automatic configuration of the L2 cache ECC even if the user, in the field, changes the computer system memory from less reliable non-ECC capable DRAM to high data integrity ECC capable DRAM.

The benefits of the present method and apparatus are very distinctive. Implementation of the present method and apparatus can be carried out and/or observed in the BIOS setup options of a given computer system. No additional hardware is required for implementing the present method and apparatus. Implementation is preferably provided within the BIOS firmware.

A computer user ultimately retains control of ECC or non-ECC implementation. That is, in the event that a computer user is running a game, computer program, or other application which might provide a motivation to change the user's performance/reliability preference, the computer user will still have the ability to override the automatic configuration through the conventional method. That is, the user can go to the BIOS setup screen and modify the L2 cache ECC support option to the desired state of ON or OFF.

The method and apparatus for automatic L2 cache ECC implementation provides for computer systems having a distinctive and easily managed feature for enhancing end user confidence. Both the total reliability and top system performance can be maintained according to the particulars of a given computer system.

The present method and apparatus are furthermore unique in that they advantageously make use of a new feature of current generation Intel® processors, adding convenience and value for the customer. The present method and apparatus may be implemented in any Pentium II® processor based, or similar, system.

In a preferred embodiment, the present method and apparatus are embodied in BIOS power on self test (POST) code that detects and configures the type of DRAM present in the computer, whether the memory is all ECC capable memory or any combination of ECC capable and non-ECC capable memory (i.e., not all ECC capable memory), and either configures L2 cache ECC at the same time or sets a flag indicating how cache should be configured later in the POST process where L2 cache is normally configured. In addition, a third option referred to herein as automatic L2 cache ECC support, or L2 cache ECC AUTO, has been added to the BIOS firmware and BIOS setup screen, the BIOS setup screen previously offering only L2 cache ECC enable or L2 cache ECC disable options. The new third option or state is stored in a non-volatile CMOS RAM for persistence across system power cycles.

A customer may purchase a computer system 10 with memory 16, memory 16 including either memory with ECC capability or memory without ECC capability. Memory with ECC capability typically costs more than memory without ECC capability. Memory with ECC capability is illustrated in FIG. 1, as noted by reference numeral 32.

The present disclosure provides a mechanism for understanding what a customer's needs are with respect to a given computer implementation and to adjust various device settings accordingly, as described further herein. For example, if a customer purchases a computer system with all ECC capable memory, then it is assumed that the customer is concerned with reliability. In connection therewith, the computer system can be set up such that ECC in the L2 cache and in the memory are enabled. Enabling of ECC in the L2 cache 22 and memory 16 causes a slight performance hit, however, the customer has a completely reliable system with ECC enabled for both L2 cache 22 and memory 16. On the other hand, if the customer purchases memory without ECC capability, it is assumed that the customer is concerned with performance more so than reliability. As a result, the computer system is then set up such that ECC in the L2 cache 22 is non-enabled. In this latter instance, the customer obtains an optimal performance. The result is a dynamic linking of two ECC capable components, in this instance memory subsystems (L2 cache I2 and memory 16), based upon a customer's needs. The present method and apparatus accordingly predict what a customer desires in terms of reliability and performance based upon a given selection of components and/or subsystems that a customer orders when a computer system is initially configured as ordered. An override is provided in the BIOS, that is, either on or off, to enable a customer to change the initial set-up settings manually as may be desired.

Referring now to FIG. 2, a flow diagram of the method of the present disclosure shall be discussed. Beginning at start 50, a first inquiry step 52 is checked whether or not the L2 cache ECC AUTO setting is selected. If the AUTO setting is not selected, then a second inquiry step 54 is checked whether or not the L2 cache ECC ENABLE setting is selected. If the L2 cache ECC ENABLE setting is selected, then in step 56, the L2 cache ECC is enabled and the process ends at step 58. If the result of the second inquiry step 54 is that the L2 cache ECC setting is DISABLE, then in step 60, the L2 cache ECC is disabled (or not enabled) and the process ends at step 58. Returning once again to the first inquiry step 52, if the AUTO setting is selected, then the process proceeds to a third inquiry step 62. The third inquiry step 62 determines whether or not the memory is all ECC capable. That is, an algorithm is executed for determining the presence or absence of all ECC capable memory on the mother board. If ECC capable memory is not present (i.e., absent), then the process proceeds to step 60. At step 60, the L2 cache ECC is disabled (or not enabled) and the process ends at step 58. Alternatively, if at step 62, ECC capable memory is found to be present, then the process proceeds to step 56, wherein the L2 cache ECC is enabled. The process then ends at step 58.

Referring now to FIG. 3, an illustration is shown of the possible system configuration combinations with respect to memory ECC, L2 cache ECC, and a resulting configuration benefit 70 for each combination. The columns include memory ECC 72, L2 cache ECC 74, and configuration benefit 70. The data fields include "Y" for yes (as being included in the system configuration) and "N" for no (as not being included in the system configuration). In a first row, the system configuration includes an all-ECC memory (in which the ECC memory is also enabled) and L2 cache ECC (enabled), which then results in the configuration benefit of an improved system reliability. In the second row, the system configuration includes no memory ECC (or a disabled all-ECC memory) and L2 cache ECC (disabled), which then results in the configuration benefit of an improved system performance. In the remaining third and fourth rows, 76a and 76b, respectively, the combinations of all-ECC memory and L2 cache ECC as shown yield a non-optimal configuration benefit. In essence, the combinations of the third and fourth rows do not make much sense, as a non-optimal configuration benefit results therefrom. The AUTO parameter in the L2 cache ECC support option of the set-up screen, as discussed herein, advantageously prevents an unintentional occurrence of the combinations of the third and fourth rows.

Turning now to FIG. 4, a mock set-up screen 80 is shown, for example, of a Dell Dimension XPS R400 computer system. The screen 80 provides various set-up information. Certain of the set-up parameters are configurable and/or modifiable. For instance, the L2 cache ECC support 82 includes a setting 84 which is modifiable, either by the computer manufacturer or the computer user. According to the present disclosure, the L2 cache ECC support setting 84 includes three (3) possible settings. The three possible settings include ENABLE, DISABLE, and AUTO. With the setting set to ENABLE, the L2 cache ECC is enabled. That is, when enabled, the L2 cache ECC support option allows error checking to occur on data accessed from the L2 cache. With the setting set to DISABLE, the L2 cache ECC is disabled. That is, if disabled, error checking on data accessed from the L2 cache is not performed. Lastly, with the setting set to AUTO, the L2 cache ECC is either enabled or disabled, according to the presence or absence, respectively, of ECC capable memory on the mother board. In a preferred embodiment, the AUTO setting is the default setting. The criteria for enabling/disabling of the L2 cache ECC with the AUTO setting may also be based upon a presence or absence of a particular operating system, as discussed herein.

Another option is ECC configuration 86 (FIG. 4). The detection algorithm provides for the detection of the presence or absence of an all-ECC capable memory on the mother board. The ECC configuration option appears on the set-up screen only if the system detects an all-ECC memory configuration. In other words, the presence of all-ECC capable memory on the mother board is indicated by the inclusion of the ECC configuration option on the set-up screen. In addition, the ECC configuration option is set to "ECC" (default) as the parameter in the option field for an optimum reliability performance. The indicator "ECC" in the option field 88 designates that ECC is enabled for the all-ECC memory. That is, the ECC memory is enabled. To disable the memory ECC, a "Non-ECC" parameter can be selected, the parameter to appear in the option field.

Variations on implementation are possible. If ECC memory is detected as indicated by the inclusion of the ECC configuration option in the set-up screen and enabled as per the "ECC" parameter, then AUTO in the option field 84 of L2 cache ECC support 82 requires that L2 cache ECC be enabled. Similarly, if ECC memory is not detected, then AUTO in the option field 84 of the L2 cache ECC support 82 requires that L2 cache ECC be disabled. Similarly, in the event that an all-ECC memory is included (i.e., detected) but ECC memory is disabled, then AUTO in the option field 84 of the L2 cache ECC support 82 requires that L2 cache ECC be disabled. Note that with the L2 cache ECC support setting 84 set to other than AUTO, a corresponding manual override setting of the L2 cache ECC takes effect.

With respect to implementation of the method and apparatus of the present disclosure, ECC capable memory must be installed and enabled, as discussed herein, to function as described with respect to the AUTO setting of the L2 cache ECC support. In other words, the ECC capable memory's functionality must also be enabled to take advantage of the benefit of the ECC capable memory, in addition to the L2 cache ECC, as discussed herein.

In accordance with the present embodiments, the logic or executable instructions for automatically detecting an ECC capable memory subsystem are preferably contained in the BIOS. BIOS makes a determination whether or not that the memory subsystem 16 does have capability for ECC or that the memory subsystem 16 does not have capability for ECC. Based upon that detection or determination, the BIOS will then automatically a) enable, or b) non-enable ECC in the L2 cache upon a system power up or system re-boot given that L2 cache ECC support is set to the AUTO setting or option.

Detection of whether or not a memory module is ECC capable can be accomplished as follows. A memory subsystem typically includes an electrically programmable read only memory (or EPROM) provided as part of a memory module. The EPROM includes a variety of information about the memory subsystem or module, for example, what kind of memory it is, what memory width it has, what speed the memory runs at, etc. The EPROM of the memory module can thus include information for identifying whether or not the module is ECC capable. In addition, the memory module may comprise a DRAM module.

As discussed above, the BIOS preferably includes a detection algorithm. The detection algorithm comprises instructions or processing steps, as required, for determining whether or not the memory subsystem is ECC capable. In one embodiment, the detection algorithm determines whether or not the memory subsystem is ECC capable by obtaining the needed information from the EPROM of the memory module or subsystem. Other methods of determining whether or not the memory subsystem is ECC capable are also possible.

One example of the BIOS executing a detection algorithm is as follows. For instance, if SPD (serial presence detect) is present on each memory module, then the BIOS can use the SPD. If SPD is not present, then the BIOS can use a different detection method. The important thing is that the BIOS performs an algorithm to detect whether or not all of the memory of the memory subsystem is ECC capable. The BIOS then reports the results of the detection algorithm to itself. ECC only works if every dual in-line memory module (DIMM) plugged into the motherboard (not shown) is ECC capable. If there are two memory modules in which one memory module is ECC capable and the other is not ECC capable, then the BIOS will default to a non-ECC state under the L2 cache ECC AUTO setting.

As discussed, a customer will generally have a choice of purchasing ECC capable memory or non-ECC capable memory with a computer system. The customer will knowingly purchase ECC capable memory if the customer is interested in increased reliability. Alternatively, a customer will likely purchase non-ECC capable memory if the customer is interested in saving money (for example, on the order of ten (10) percent or so) and not interested in the extra cost involved with the ECC capable memory, or for other reasons. The customer may be interested only in performance and thus not purchase the ECC capable memory.

With respect to a computer system containing ECC capable memory and ECC L2 cache, a customer or computer user may choose to enable L2 ECC or not to enable L2 ECC (i.e., disable L2 ECC) according to the preference of the customer or user. Selection of enabling L2 ECC can be made using BIOS set up at a BIOS set up screen for example, as shown in FIG. 4. The present method and apparatus provide three option settings with respect to ECC and more particularly, to L2 cache ECC support. The L2 cache ECC support option settings include ENABLE, DISABLE, and AUTO. The option field is provided under the L2 cache ECC support, enablement of the L2 cache ECC. The AUTO feature or setting instructs the computer BIOS to perform an ECC detection algorithm, further for determining whether or not to match the L2 ECC enable/disable setting to the memory's ECC capability. The AUTO feature described herein is novel and advantageously provides for an avoidance of non-optimal selected configuration settings. The ENABLE and DISABLE option settings provide for a manual override of the AUTO setting in such instances when a computer user desires to manually override the functionality of the AUTO setting.

In operation, assume that a customer purchases a computer having the AUTO ECC capable detection option setting selected as discussed herein. If the customer also purchases ECC capable memory, i.e., all memory modules plugged into the motherboard of the computer system include ECC capable memory modules, then with the method and apparatus of the present disclosure, the AUTO option setting facilitates the detection of ECC capable memory and advantageously assures an optimal operation of the computer system. Accordingly, in conjunction with the detection of ECC capable memory, either both the L2 ECC cache and the ECC memory are enabled or both the L2 ECC cache and the ECC memory are disabled. As a result, the non-optimal situation of having L2 ECC cache disabled and ECC memory enabled is advantageously avoided. In addition, in conjunction with a computer system having ECC capable memory, the disadvantageous situation of having L2 ECC cache enabled and ECC memory disabled is also avoided. The table illustrated in FIG. 3 summarizes the configuration benefit 70 of the various combinations of ECC capable memory 72 and L2 cache ECC 74. Non-optimal configurations 76 are avoided with the L2 cache ECC AUTO setting.

A customer may also have initially purchased a computer with non-ECC capable memory and subsequently purchase and install ECC capable memory. Assume that all of the memory connected to the motherboard (not shown) of the computer system is now all ECC capable memory. Upon system power-up or re-boot, with the L2 ECC cache option setting set to AUTO, the BIOS will execute the detection algorithm. The detection algorithm determines that all ECC capable memory is resident and connected to the mother board. Thus, the BIOS sets the L2 cache for ECC enabled or ECC disabled in accordance with the detected option state of the ECC capable memory, or vice versa.

In the situation of a computer system having any combination of ECC capable and non-ECC capable memory (i.e., not all ECC capable memory), with the AUTO setting of the present disclosure, the BIOS would determine that the memory was not ECC capable and then disable the L2 cache ECC. As a result, an optimal performance is obtained. The customer may alternatively select to manually override the AUTO setting by selecting the ENABLE option setting or the DISABLE option setting for the L2 cache ECC support of the BIOS setup screen. In the latter instance, a system performance and reliability will be influenced according to the selected option.

The AUTO setting according to the method and apparatus of the present disclosure enables the BIOS to execute the detection algorithm and enable or disable the L2 cache ECC in response to the detection results. If the manual ENABLE or manual DISABLE setting is selected, then the BIOS does not execute the detection algorithm and the L2 cache ECC is manually enabled or manually disabled, respectively. The method and apparatus of the present disclosure advantageously provides a third state for L2 cache ECC support.

The BIOS and chip set logic can be used together to make the determination of whether or not the memory installed in the computer system is all ECC capable or not. That is, in one embodiment, a determination is made as to whether or not the memory installed contains an extra bit per byte. One method for detection would be to check for the presence of a SPD (serial presence detect) or other suitable indicator for the presence of ECC capable memory.

Suitable program code in the BIOS ROM is executed for determining whether or not the memory is all ECC capable or not. Upon a determination of the type of memory, BIOS then executes the appropriate steps to configure the chip set to use the memory according to whether the memory is all ECC capable or not. Additionally, after the BIOS has been determined whether the memory is all ECC capable or non-ECC capable, then the BIOS sets the L2 cache ECC to the same state as the memory subsystem. A detection algorithm has thus been added to the program instructions of the BIOS. Is the memory ECC? If yes, then enable the L2 cache ECC. If no, then disable the L2 cache ECC. As indicated herein, the processor module includes an L2 cache capable of ECC. The tradeoff is reliability or performance.

As mentioned above, with currently available computer systems, there are two choices for L2 cache ECC support. A first choice is always enable L2 cache ECC. The other choice is always disable the L2 cache ECC support. Irregardless of whether or not the memory is ECC capable, the L2 cache ECC support is either enabled or disabled with known systems. In other words, upon the manufacture of a given computer system, the L2 cache ECC support is thus either enabled or disabled, irregardless of whether or not the memory is ECC capable. Furthermore, it is a rather esoteric issue to educate a customer about getting into the setup field and enabling or disabling of the L2 cache ECC support. Thus, on the one hand, with L2 cache ECC support enabled, an increased reliability is obtained, however at the cost of decreased performance. On the other hand, with L2 cache ECC disabled, an increase in performance is obtained, however at the cost of decreased reliability. In each situation, the computer manufacturer makes the decision whether or not to enable L2 cache ECC or to leave L2 cache ECC disabled.

In addition to the above, one could look at the customer order information pertaining to a particular computer system to see whether or not the customer ordered ECC capable memory. Given that the customer ordered ECC capable memory, the likelihood is that the customer also desired for the L2 cache ECC to be enabled also.

The present method and apparatus allows for configuring of the L2 cache ECC by a computer user every time the computer is powered up or re-booted. The present method and apparatus furthermore may also include any software which resides within the particular computer system for making the decision to enable or disable L2 cache ECC automatically according to the embodiments presented herein.

The detection means is coupled with an algorithm, wherein the algorithm is disposed somewhere within the computer system, for example, on the motherboard, residing in the BIOS, or some other suitable location. The algorithm may also be included within a utility program which can be loaded into system memory or the like.

Any given computer system is initially set-up with the L2 cache ECC configured for either being enabled or disabled, as determined by the computer manufacturer. As discussed herein, if a computer system initially does not contain ECC capable memory, and a customer decides subsequent to the manufacture of the computer system to include ECC capable memory, then with the present method and apparatus the insertion of ECC capable memory and its optimal configuration are automatically handled. That is, the detection means detects the presence of the ECC capable memory and ensures that L2 cache ECC is also enabled. As a result, an optimal system configuration is easily achieved.

Prior to the present method and apparatus, if a customer would have purchased memory ECC for inclusion into his or her computer system subsequent to the system's fabrication, the customer would not be readily aware of whether or not L2 cache ECC is enabled or disabled without first digging through a lot of documentation. With the automated feature of the present disclosure, upon a system boot-up, the appropriate enabling or disabling of L2 cache ECC would be carried out given that the L2 cache ECC support is set to AUTO, as discussed herein. Upon physically installing ECC capable memory into a given computer system, no further action would be required by the computer user for the appropriate enabling of L2 cache ECC. The detection means would make a determination of whether or not ECC capable memory is detected, and upon a detection of ECC capable memory, the L2 cache ECC is enabled. Similarly, upon no detection of ECC capable memory by the detection means, the L2 cache ECC is either non-enabled or disabled, as the case may be. When the system is booted up, the boot strap program in BIOS is executed. The boot strap program executes the means for determining whether or not ECC capable memory is present in the computer system. Upon detection of the ECC capable memory, the boot strap program ensures that L2 cache ECC is enabled. The present method and apparatus simplifies the obtaining of an optimal configuration of a computer system with respect to enabling or disabling L2 cache ECC, further in conjunction with a detection of the availability or non-availability of ECC capable memory.

In the situation of a customer who purchases memory which is ECC capable and the customer installs the same on a computer having the present automatic detection/setting method and apparatus of the present disclosure, the following occurs. Assuming for this example that the detection algorithm resides in BIOS, upon a system power up or re-boot, the system checks to determine if the memory is ECC capable, and if so, enables the L2 cache ECC. Likewise, if the system had determined that the memory was not ECC capable, then the L2 cache ECC would have been disabled. The customer or system user is thus not required to make any decision about, or to take any further action with respect to, whether or not to enable or disable the L2 cache ECC. The customer simply installs the ECC capable memory into the computer system and an optimal configuration can be obtained.

As mentioned above, the detection algorithm is preferably provided in the BIOS. As a result, the detection algorithm stays with the system motherboard. Accordingly, if the motherboard is being upgraded to include ECC capable memory, then the detection algorithm would already be present within the BIOS and thus provide the benefits and advantages as discussed herein. Residing within BIOS, the detection algorithm is thus located below an operating system level, thereby having a universal effect. For example, DOS games can be beneficially influenced. In addition, if the system happened to be re-booted off from a particular hard drive or diskette drive, then the algorithm, residing in BIOS, would still be executed no matter which drive the computer system is being booted from.

Alternatively, the detection algorithm may also reside in a computer program or application software which resides on a diskette or other storage medium, however, its effect would not be as universal as residing in BIOS. The computer program on diskette could perform a similar detection algorithm/function as discussed herein.

Another example of operation of the present method and apparatus includes a system having L2 cache ECC, but not having ECC capable memory. Such an instance may involve a computer user who is interested primarily in computer games or the like, in which an optimal performance is desired. Thus, the system may be initially set up with the L2 cache ECC disabled for providing an optimum performance. However, the system user may subsequently desire to temporarily enable the L2 cache ECC to provide an improved reliability for a particular program application, for example, a financial software package. An algorithm may be included within the financial software to detect the presence or absence of ECC capable memory and the setting of the L2 cache ECC. If ECC capable memory is detected, then the L2 cache ECC and memory ECC are enabled. If ECC capable memory is not detected, then the L2 cache ECC is enabled if it is not already enabled. As a result, a best increased reliability can be obtained during the execution of the financial software package. The reverse is also applicable. That is, if the system were set up for reliability (L2 cache ECC and ECC capable memory enabled) and a software package requires an optimal performance, then the software package could also include an algorithm for ensuring that L2 cache ECC and memory ECC are disabled during the program execution. Thus, a software or computer program could change the L2 cache ECC setting, depending upon the reliability or performance requirements of the software being executed. In other words, L2 cache ECC can be dynamically changed as necessary for providing an optimal program execution in accordance to the requirements of a given software program.

In an alternate embodiment, the detection may also be based upon the type of operating system present in the computer system. For instance, with Windows NT operating system, reliability might be a primary concern. For another operating system, performance might be a primary concern. Thus, the algorithm of the present disclosure may detect the presence of a particular type of operating system and upon such a detection of the presence of the particular type of operating system, enabling or disabling the L2 cache ECC accordingly. Or conversely, the operating system itself might detect the ECC capability of the L2 cache and memory subsystem and make the appropriate adjustments.

With built-to-order manufacturing of a computer system, a customer makes a decision as to which components to have installed into the customer's computer system. Given a customer order, in the built-to-order factory, the components selected by the customer are installed in the customer's built-to-order computer system. For example, if the customer orders ECC capable memory, then ECC capable memory is installed at the factory by the manufacturer. In addition, the ECC memory field shows up in the set-up screen when the system includes ECC memory. Furthermore, the ECC memory is configurable in that the ECC functionality of the memory can be enabled or disabled.

ECC guarantees the data integrity of a single bus. For memory, ECC guarantees the integrity of the data bus between the chip set core logic and the memory. As far as memory ECC is concerned, the bits of ECC data for the memory are transferred between the memory and the core logic, further wherein the memory ECC bits are not related to the L2 cache ECC. The L2 cache ECC guarantees the integrity of data between the L2 cache and the processor and is not related to the memory ECC.

The present method and apparatus advantageously addresses a performance increase in system program execution when the system only includes L2 cache ECC and no all-ECC capable memory. The present method and apparatus further provides a performance increase in system program execution upon the detection of an all-ECC capable memory, but when the ECC memory is not enabled. However, when an all-ECC capable memory is present and enabled, then L2 cache ECC is guaranteed to be enabled, using the AUTO parameter in the L2 cache ECC support option of the set-up screen.

If a customer is spending extra money to purchase an all-ECC memory, then it is assumed that the customer desires L2 cache ECC enabled. The assumption in such an instance is that the customer is concerned about obtaining an overall system reliability, and furthermore, that the customer would want ECC enabled where ever ECC occurs (if at all) elsewhere in the computer system.

A computer user may desire an increased performance for execution of a given computer game program to be run on the computer system. In such a situation, the computer user could merely disable the memory ECC, and the present method and apparatus would enable the increased performance to be implemented without any further effort of the computer user. That is, with the L2 cache ECC option set to AUTO, then the disabling of the ECC memory would result in the disabling of the L2 cache ECC automatically upon a re-boot of the computer system or during an execution of the given computer game program.

The method and apparatus of the present disclosure advantageously aligns the error checking and correcting of the L2 cache ECC and the memory ECC within a computer system configuration, such that the total system configuration of the given computer system is set-up for either an optimal reliability or an optimal performance.

In its present state, the computer industry is focused on price, performance, and reliability. The present method and apparatus thus provides a key feature, directed to providing an optimal configuration which adjusts itself automatically for performance or reliability according to a particular ECC configuration implementation of the computer system. An undesirable performance loss could occur if an L2 cache ECC is enabled while there is an absence of an enabled all-ECC memory, wherein the undesired performance loss could disadvantageously be interpreted as reflecting negatively upon the given computer system configuration produced by the computer manufacturer in the computer industry.

Alignment of ECC as discussed herein with respect to L2 cache ECC and the all-ECC memory thus provides for an improved computer system configuration. While the above discussion specifically identified the alignment of L2 cache ECC and the all-ECC memory, any other ECC components and/or subsystems, not specifically mentioned herein above but incorporated into a given computer system configuration, could also be advantageously aligned in a similar manner as indicated herein above with respect to the L2 cache ECC and all-ECC memory. When ECC subsystems are included and enabled within a given computer system configuration, L2 cache ECC or other ECC subsystem is advantageously aligned with the other ECC subsystems, even if there is a decrease in system performance. On the other hand, if ECC subsystems are included within a given system configuration, the AUTO feature/parameter in the L2 cache ECC, or other ECC subsystem, support option of the system set-up would act to set L2 cache ECC, or similar ECC subsystem to a) enable or b) disable according to whether or not all ECC installed subsystems are either a) all enabled or b) not all enabled, respectively. Any potential data bus within the computer system configuration could include ECC.

As discussed, in currently available processor modules, L2 cache ECC has been added to the processor modules to provide a further reliability. Traditionally, reliability of a computer system has been improved with the addition of memory ECC. The all-ECC memory and L2 cache ECC combination as discussed herein provide a primary decision point. All other sub-functions of a computer configuration can be considered as being carried out by tertiary devices, wherein any corresponding ECC could be based upon a customer's individual preferences and settings of a respective ECC. The present implementation further would also provide for improved performance/reliability reviews of a given computer configuration. Still further, a customer's pricing decision also influences the choices which a customer makes (e.g., whether to purchase an all-ECC memory or not) in the ordering and building of a built-to-order computer system. Basing the ECC alignment primarily upon memory ECC is thus appropriate.

There is currently no known coupling of the L2 cache ECC support with the memory ECC as discussed herein with respect to the method and apparatus of the present disclosure. Customer configurations are thus made optimal. The present method and apparatus includes an algorithm for searching the components of a computer configuration for the presence of an all-ECC memory, furthermore to determine whether the all-ECC memory is enabled, and if so, the L2 cache ECC is enabled in response thereto. As a result, the ECC of the computer system is optimally aligned accordingly as discussed herein for providing either an optimized improved reliability or an optimized improved performance. Problems in the art are advantageously overcome with the alignment of the ECC components, in particular, memory ECC and L2 cache ECC, within a computer system configuration in an automated manner as discussed herein.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed:

1. A computer system comprising:
   at least one microprocessor having an L2 cache, the L2 cache further having error checking and correcting capability (ECC);
   at least one memory, said at least one memory including either all ECC capable memory or any combination of ECC capable and non-ECC capable memory; and
   basic input output system (BIOS) firmware including an L2 cache support feature, the L2 cache support feature having three user-selectable options, the three options including i) L2 cache ECC ON for enabling L2 cache ECC, ii) L2 cache ECC OFF for not enabling L2 cache ECC, and iii) L2 cache ECC AUTO for automatically enabling or not enabling L2 cache ECC in response to a detection of the presence of a) all ECC capable memory or b) any combination of ECC and non-ECC capable memory, respectively.

2. The computer system of claim 1, further comprising a motherboard, wherein said at least one memory is disposed upon said motherboard.

3. The computer system of claim 1, wherein said BIOS firmware further includes executable instructions for determining if the L2 cache ECC AUTO option is selected, and
   a) in response to a determination of the L2 cache ECC AUTO option being selected, determining if said at least one memory includes all ECC capable memory, and in response to a determination of all ECC capable memory, then enabling L2 cache ECC, otherwise not enabling L2 cache ECC, and
   b) in response to a determination of other than the L2 cache ECC AUTO option being selected, determining if the L2 cache ECC ON option is selected, and in response to a determination of the selection of the L2 cache ECC ON option, then enabling the L2 cache ECC, otherwise not enabling L2 cache ECC.

4. A computer system comprising:
   at least one microprocessor having an L2 cache, the L2 cache further having error checking and correcting capability (ECC);
   at least one memory, said at least one memory including either all ECC capable memory or any combination of ECC capable and non-ECC capable memory;
   at least one component in addition to the L2 cache, said at least one additional component including either all ECC capable components or any combination of ECC capable and non-ECC capable components; and basic input output system (BIOS) firmware including an L2 cache support feature, the L2 cache support feature having three user-selectable options, the three options including i) an L2 cache ECC ON option for enabling L2 cache ECC, ii) an L2 cache ECC OFF option for not enabling L2 cache ECC, and iii) an L2 cache ECC AUTO option for automatically enabling or not enabling L2 cache ECC in response to a determination of the presence of a) all ECC capable memory of said memory and all ECC capable components of said at least one additional component and b) any combination of ECC and non-ECC capable memory and components of said memory and said at least one additional component, respectively.

5. The computer system of claim 4, further comprising a motherboard, wherein said at least one memory and said at least one additional component are disposed upon said motherboard.

6. The computer system of claim 4, wherein said BIOS firmware further includes executable instructions for determining if the L2 cache ECC AUTO option is selected, and
   a) in response to a determination of the L2 cache ECC AUTO option being selected, determining if said at least one memory includes all ECC capable memory, and in response to a determination of all ECC capable memory, then enabling L2 cache ECC, otherwise not enabling L2 cache ECC, and
   b) in response to a determination of other than the L2 cache ECC AUTO option being selected, determining if the L2 cache ECC ON option is selected, and in response to a determination of the selection of the L2 cache ECC ON option, then enabling the L2 cache ECC, otherwise not enabling L2 cache ECC.

7. The computer system of claim 4, wherein said BIOS firmware further includes executable instructions for determining if the L2 cache ECC AUTO option is selected, and
   a) in response to a determination of the L2 cache ECC AUTO option being selected, determining if said at least one component includes all ECC capable components, and in response to a determination of all ECC capable components, then enabling L2 cache ECC, otherwise not enabling L2 cache ECC, and
   b) in response to a determination of other than the L2 cache ECC AUTO option being selected, determining if the L2 cache ECC ON option is selected, and in response to a determination of the selection of the L2 cache ECC ON option, then enabling the L2 cache ECC, otherwise not enabling L2 cache ECC.

8. A computer system comprising:
   at least one microprocessor having an L2 cache, the L2 cache further having error checking and correcting capability (ECC);
   at least one memory;
   at least one component in addition to the L2 cache, said at least one additional component including either all ECC capable components or any combination of ECC capable and non-ECC capable components; and
   basic input output system (BIOS) firmware including an L2 cache support feature, the L2 cache support feature having three user-selectable options, the three options including i) an L2 cache ECC ON option for enabling L2 cache ECC, ii) an L2 cache ECC OFF option for not enabling L2 cache ECC, and iii) an L2 cache ECC AUTO option for automatically enabling or not enabling L2 cache ECC in response to a determination of the presence of a) all ECC capable components of said at least one component and b) any combination of ECC capable and non-ECC capable components of said at least one component, respectively.

9. The computer system of claim 8, wherein said at least one component includes a computer program, the computer program having an ECC capability, wherein selection of L2 cache ECC AUTO enables an optimal reliability to be obtained during a program execution of the computer program.

10. The computer system of claim 8, wherein said at least one component includes a computer program, the computer program not having an ECC capability, wherein selection of L2 cache ECC AUTO enables an optimum performance to be obtained during a program execution of the computer program.

11. A method for optimizing either a performance or a reliability of a computer system during operation thereof, said method comprising the steps of:
   providing at least one microprocessor having an L2 cache, the L2 cache further having error checking and correcting capability (ECC);
   providing at least one memory, the at least one memory including either all ECC capable memory or any combination of ECC capable and non-ECC capable memory; and
   providing basic input output system (BIOS) firmware including an L2 cache support feature, the L2 cache support feature having three user-selectable options, the three options including i) L2 cache ECC ON for enabling L2 cache ECC, ii) L2 cache ECC OFF for not enabling L2 cache ECC, and iii) L2 cache ECC AUTO for automatically enabling or not enabling L2 cache ECC in response to a detection of the presence of a) all ECC capable memory or b) any combination of ECC and non-ECC capable memory, respectively.

12. The method of claim 11, further comprising the step of providing a motherboard, wherein the at least one memory is disposed upon the motherboard.

13. The method of claim 11, wherein the BIOS firmware further includes executable instructions for determining if the L2 cache ECC AUTO option is selected, and
   a) in response to a determination of the L2 cache ECC AUTO option being selected, determining if the at least one memory includes all ECC capable memory, and in response to a determination of all ECC capable memory, then enabling L2 cache ECC, otherwise not enabling L2 cache ECC, and
   b) in response to a determination of other than the L2 cache ECC AUTO option being selected, determining if the L2 cache ECC ON option is selected, and in response to a determination of the selection of the L2 cache ECC ON option, then enabling the L2 cache ECC, otherwise not enabling L2 cache ECC.

14. A method for optimizing either a performance or a reliability of a computer system during operation thereof, said method comprising the steps of:
   providing at least one microprocessor having an L2 cache, the L2 cache further having error checking and correcting capability (ECC);
   providing at least one memory, the at least one memory including either all ECC capable memory or any combination of ECC capable and non-ECC capable memory;
   providing at least one component in addition to the L2 cache, the at least one additional component including either all ECC capable components or any combination of ECC capable and non-ECC capable components; and providing basic input output system (BIOS) firmware including an L2 cache support feature, the L2 cache support feature having three user-selectable options, the three options including i) an L2 cache ECC ON option for enabling L2 cache ECC, ii) an L2 cache ECC OFF option for not enabling L2 cache ECC, and iii) an L2 cache ECC AUTO option for automatically enabling or not enabling L2 cache ECC in response to a determination of the presence of a) all ECC capable memory of the memory and all ECC capable components of the at least one additional component and b) any combination of ECC and non-ECC capable memory and components of the memory and the at least one additional component, respectively.

15. The method of claim 14, further comprising the step of providing a motherboard, wherein the at least one memory and the at least one additional component are disposed upon the motherboard.

16. The method of claim 14, wherein the BIOS firmware further includes executable instructions for determining if the L2 cache ECC AUTO option is selected, and a) in response to a determination of the L2 cache ECC AUTO option being selected, determining if the at least one memory includes all ECC capable memory, and in response to a determination of all ECC capable memory, then enabling L2 cache ECC, otherwise not enabling L2 cache ECC, and b) in response to a determination of other than the L2 cache ECC AUTO option being selected, determining if the L2 cache ECC ON option is selected, and in response to a determination of the selection of the L2 cache ECC ON option, then enabling the L2 cache ECC, otherwise not enabling L2 cache ECC.

17. The method of claim 14, wherein the BIOS firmware further includes executable instructions for determining if the L2 cache ECC AUTO option is selected, and a) in response to a determination of the L2 cache ECC AUTO option being selected, determining if the at least one component includes all ECC capable components, and in response to a determination of all ECC capable components, then enabling L2 cache ECC, otherwise not enabling L2 cache ECC, and b) in response to a determination of other than the L2 cache ECC AUTO option being selected, determining if the L2 cache ECC ON option is selected, and in response to a determination of the selection of the L2 cache ECC ON option, then enabling the L2 cache ECC, otherwise not enabling L2 cache ECC.

18. A method for optimizing either a performance or a reliability of a computer system during operation thereof, said method comprising the steps of:

providing at least one microprocessor having an L2 cache, the L2 cache further having error checking and correcting capability (ECC);

providing at least one memory;

providing at least one component in addition to the L2 cache, the at least one additional component including either all ECC capable components or any combination of ECC capable and non-ECC capable components; and providing basic input output system (BIOS) firmware including an L2 cache support feature, the L2 cache support feature having three user-selectable options, the three options including i) an L2 cache ECC ON option for enabling L2 cache ECC, ii) an L2 cache ECC OFF option for not enabling L2 cache ECC, and iii) an L2 cache ECC AUTO option for automatically enabling or not enabling L2 cache ECC in response to a determination of the presence of a) all ECC capable components of the at least one component and b) any combination of ECC capable and non-ECC capable components of the at least one component, respectively.

19. The method of claim 18, wherein the at least one component includes a computer program, the computer program having an ECC capability, wherein selection of L2 cache ECC AUTO enables an optimal reliability to be obtained during a program execution of the computer program.

20. The method of claim 18, wherein the at least one component includes a computer program, the computer program not having an ECC capability, wherein selection of L2 cache ECC AUTO enables an optimum performance to be obtained during a program execution of the computer program.

* * * * *